United States Patent
Gouselis (10) Patent No.: US 10,495,179 B2
(45) Date of Patent: Dec. 3, 2019

(54) DEVICE FOR REDUCING ROTARY VIBRATIONS IN A DRIVETRAIN

(71) Applicant: Bayerische Motoren Werke Aktiengesellschaft, Munich (DE)

(72) Inventor: Michail Gouselis, Kleinaitingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/058,116

(22) Filed: Aug. 8, 2018

(65) Prior Publication Data

US 2018/0347663 A1 Dec. 6, 2018

Related U.S. Application Data

(63) Continuation of application No. PCT/EP2017/052611, filed on Feb. 7, 2017.

(30) Foreign Application Priority Data

Feb. 12, 2016 (DE) .................. 10 2016 202 178

(51) Int. Cl.
  *F16F 15/16* (2006.01)
  *F16D 3/80* (2006.01)

(52) U.S. Cl.
  CPC .............. *F16F 15/161* (2013.01); *F16D 3/80* (2013.01)

(58) Field of Classification Search
  CPC .. F16F 15/00; F16F 15/10; F16F 15/16; F16F 15/161; F16D 3/80
  See application file for complete search history.

(56) References Cited

U.S. PATENT DOCUMENTS

| | | | | |
|---|---|---|---|---|
| 5,761,969 A | * | 6/1998 | Vollett | F16F 15/161 464/68.3 |
| 2011/0226576 A1 | | 9/2011 | Feldhaus et al. | |
| 2019/0032748 A1 | * | 1/2019 | Orlamunder | F16F 15/02 |

FOREIGN PATENT DOCUMENTS

| | | |
|---|---|---|
| CN | 101235872 A | 8/2008 |
| CN | 102197240 A | 9/2011 |
| CN | 104295662 A | 1/2015 |
| DE | 34 11 092 A1 | 5/1985 |
| DE | 87 13 332 U1 | 12/1987 |
| DE | 41 06 414 A1 | 9/1991 |
| DE | 10 2008 017 402 A1 | 10/2009 |

(Continued)

OTHER PUBLICATIONS

International Search Report (PCT/ISA/210) issued in PCT Application No. PCT/EP2017/052611 dated May 18, 2017 with English translation (five pages).

(Continued)

*Primary Examiner* — Prasad V Gokhale
(74) *Attorney, Agent, or Firm* — Crowell & Moring LLP (57) ABSTRACT

A rotary vibration reduction device for a motor vehicle for transmitting drive power from a drive machine to a drivetrain is provided. The vibration reduction device includes a primary and secondary connectors between the drive machine and drivetrain, and a coupling device between the primary connector and the secondary connector. The coupling device has a vibration reduction actuator with a piston chamber and has a piston element movable to generate a vibration reduction force in response to changes in working pressure in the piston chamber controlled by a pressure-generating device.

16 Claims, 6 Drawing Sheets

(56) References Cited

FOREIGN PATENT DOCUMENTS

| DE | 10 2009 013 750 A1 | 9/2010 |
| EP | 1 953 411 A2 | 8/2008 |
| EP | 2 143 973 A1 | 1/2010 |
| EP | 3 043 035 A1 | 7/2016 |

OTHER PUBLICATIONS

German-language Written Opinion (PCT/ISA/237) issued in PCT Application No. PCT/EP2017/052611 dated May 18, 2017 (six pages).
German-language Office Action issued in counterpart German Application No. 10 2016 202 178.8 dated Aug. 4, 2016 (four pages).
Chinese-language Office Action issued in counterpart Chinese Application No. 201780004390.1 dated Mar. 22, 2019 with English translation (14 pages).

* cited by examiner

DEVICE FOR REDUCING ROTARY VIBRATIONS IN A DRIVETRAIN

CROSS REFERENCE TO RELATED APPLICATIONS

This application is a continuation of PCT International Application No. PCT/EP2017/052611, filed Feb. 7, 2017, which claims priority under 35 U.S.C. § 119 from German Patent Application No. 10 2016 202 178.8, filed Feb. 12, 2016, the entire disclosures of which are herein expressly incorporated by reference.

BACKGROUND AND SUMMARY OF THE INVENTION

The invention concerns a device for reducing rotary vibrations on transmission of a drive power which may be provided by an internal combustion engine in the motor vehicle. A rotary vibration reduction device according to the preamble is known from the prior art, in particular as a dual mass flywheel from DE 8713332 U1.

The invention is described below with reference to a drivetrain for a motor vehicle with an internal combustion engine working on the reciprocating piston principle, but this should not be regarded as a restriction of the invention to such an embodiment. Internal combustion engines working on the reciprocating piston principle, because of their design, have an uneven drive torque, i.e. the torque which can be output by such an engine is loaded with rotary vibrations or rotational irregularities which often detract from the driving comfort of a motor vehicle.

The drive torque provided by such a drive machine may be considered as a mean torque which is overlaid by rotational irregularities in the form of a vibration. Such rotary vibrations or rotational irregularities are primarily transmitted to the drivetrain and perceived as uncomfortable by the vehicle occupants. In the prior art, there are numerous devices for reducing such rotary vibrations. In this context, so-called dual mass flywheels (ZMS) are of primary importance. In these, a primary connector may be coupled to the internal combustion engine and a secondary connector may be coupled to the further drivetrain. The two connectors can be connected together via a spring device or a spring and damper device. A rotary vibration provokes a rotational movement of the primary connector relative to the secondary connector, wherein these rotary vibrations are firstly reduced by the vibratable sprung mass system, and also can be damped and hence further reduced by the damper device.

DE8713332U1 deals with a dual mass flywheel for a drive system of a motor vehicle consisting of a first rotary mass attached to the crankshaft of the internal combustion engine, a second rotary mass connected to the gearbox input components and mounted rotationally on the first rotary mass, and a torsion damping device between the two rotary masses for damping torsional vibrations. In general, such a system is also known from DE 3411092 A1.

It is an object of the invention to specify an improved device for reducing rotary vibrations.

A rotary vibration reduction device in the sense of the invention means a device for a motor vehicle which is configured to transmit a drive power, in the form of a torque and a rotation speed, from a drive machine to a drivetrain. The rotary vibration reduction device is provided in particular for use with an internal combustion engine working on the reciprocating piston principle. Further preferably, this is configured as a hydraulic device and, since the fluids normally used in such a device are incompressible, preferably includes a device which has a spring stiffness or an elasticity in order to form a vibratable system. In a particularly preferred embodiment of the invention, brake fluid is used as the fluid since this is particularly stable against pressure and temperature.

In the sense of the invention, the drivetrain to which the drive power transmissible via the rotary vibration reduction device is output by the drive machine, is understood to be a shaft or a gearbox or another component which is designed to transmit this drive power in the direction of at least one drivable wheel of a motor vehicle.

In the sense of the invention, a primary connector of the rotary vibration reduction device is the portion of this device to which the drive torque from the internal combustion engine can be transmitted. Preferably, the primary connector can be connected to a crankshaft of the internal combustion engine, further preferably can be connected rotationally fixedly thereto, preferably directly thereto.

In the sense of the invention, a secondary connector of the rotary vibration reduction device is a portion thereof which is firstly configured to transmit to the drivetrain the drive power which is transmitted from the internal combustion engine to the rotary vibration reduction device, and secondly the secondary connector is mounted rotatably relative to the primary connector, in particular through a specific angular range, preferably of less than 360°. Further preferably, the secondary connector can be connected to a clutch for selective transmission of the drive power to a gearbox, preferably with a start-up clutch or preferably with a torque converter.

Here, the primary connector can be connected to the secondary connector by a coupling device, in particular can be connected such that the drive power can be transmitted from the primary connector to the secondary connector, in particular in the form of a torque and a rotation speed. Further preferably, the primary connector and the secondary connector are arranged coaxially to each other and, to transmit the drive power, rotate about a common main axis, in particular about the same axis about which the crankshaft of the internal combustion engine also rotates. In relation to the transmission of drive power, the coupling device is thus arranged between the primary and secondary connectors.

The coupling device preferably includes a vibration reduction actuator with a piston chamber and a piston element which is movable in said piston chamber. Here, the piston element may be loaded with a working pressure in the piston chamber in order to generate a reduction force. Figuratively, the vibration reduction actuator is preferably configured as a gas pressure actuator or a gas pressure cylinder, or preferably as a hydraulic actuator or hydraulic cylinder. Preferably, the piston chamber and piston element can be coupled with the primary and secondary connectors such that a rotational movement of the primary connector relative to the secondary connector generates a displacement of the piston element in the piston chamber. Further preferably, with such a connection a rotational irregularity imposed on the primary connector can be reduced by the coupling device, in particular by a corresponding control of the working pressure. Preferably, the vibration reduction actuator has a partially or completely arcuate form.

Here, this movement of the primary connector relative to the secondary connector is achieved against the reduction force generated by the working pressure in the piston chamber. Advantageously, the working pressure in the piston chamber can be controlled by a pressure-generating device, and hence via this the reduction force is controllable. Further preferably, the reduction force is selected such that the quasi-statically transmissible drive torque (mean torque or torque without superposition of rotational irregularities) can be transmitted without a twist of the primary connector relative to the secondary connector. In contrast, in a conventional system, for example a ZMS, this drive torque would lead to a preload on the bow springs and hence to a twist of a primary mass of such a ZMS relative to its secondary mass.

With the proposed device, it is thus possible to set the reduction force within a wide range. In particular, it is thus possible to achieve a particularly high extent of vibration reduction.

In a preferred embodiment, the piston chamber can be filled by a hydraulic fluid, preferably with an incompressible fluid. Further preferably with an oil, in particular a hydraulic oil and preferably with brake fluid. In this embodiment, the vibration reduction actuator is configured as a hydraulic actuator, preferably with a circular piston face and particularly preferably with a cylindrical form of the piston chamber. In particular with such a fluid, which is not compressible or only slightly compressible, a particularly good controllability of the system can be achieved.

In a further preferred embodiment, the vibration reduction actuator is a device which can be filled with a gas as the working medium, preferably a gas pressure cylinder, and preferably its piston chamber can be filled with a gas. Such a gas may in particular be air. In particular, by means of a gas pressure cylinder, the rotary vibration reduction device can be constructed particularly simply.

In a preferred embodiment, the pressure-generating device is formed as a hydraulic or pneumatic device for providing a working pressure. Preferably, such a device may be filled with a hydraulic medium for generating the working pressure. Preferably, the pressure-generating device may be or is connected fluid-conductively to the piston chamber of the vibration reduction actuator. Further preferably, the pressure-generating device is formed in the same way as the vibration reduction actuator, i.e. either both are formed as hydraulic or as gas pressure devices. Further preferably, the two devices are configured as different types, i.e. one is a gas pressure device and the other a hydraulic device.

In a preferred embodiment, the rotary vibration reduction device includes a pressure-balancing device. Preferably, the pressure-balancing device is a preloadable pressure accumulator; in particular, this is a spring since this introduces an elasticity into the system. Further preferably, the pressure-balancing system includes a mechanical spring, preferably a gas spring, or preferably a device with a solid-body spring, in particular a metal spring, preferably a steel spring or an elastomer spring, or a combination of several of said springs. Preferably, the pressure-balancing device is a hydraulic spring; since a hydraulic fluid which may be received therein is usually incompressible, this can be combined with a spring element of the type cited above. Such embodiments of a pressure-balancing device are known from the prior art and particularly reliable in function.

According to a preferred basic concept, by the combination of a vibration reduction actuator for coupling the primary and secondary connectors, a pressure-generating device for setting the working pressure, and a pressure-balancing device for providing a spring rate, it is possible to achieve an advantageous vibration reduction. The working pressure is here set as a function of a mean torque to be transmitted, such that as a result, effectively no twist, or no substantial twist, occurs of the secondary connector relative to the primary connector because of this torque. If rotary vibrations are superposed over the mean torque, i.e. a torque irregularity, as is inherent in the system with an internal combustion engine working on the reciprocating piston principle, the pressure-balancing device is excited to vibrate and hence these irregularities are transmitted at least incompletely to the secondary connector, and hence a vibrational decoupling of the secondary connector from the primary connector can be achieved.

Further preferably, the pressure-balancing device may be connected fluid-conductively to the pressure-generating device. In particular, using the pressure-balancing device a working pressure may be applied so that with the pressure-generating device, pressure fluctuations can be damped which are induced by the rotational irregularities which may be imposed on the primary connector. In particular, due to the fluid-conductive connection of the pressure-generating and pressure-balancing devices, the pressure-balancing device is preloaded with the working pressure. The working pressure applied by the pressure-generating device can be provided with particularly little energy since only a small volume flow is moved, and hence a particularly efficient operation of the rotary vibration reduction device is possible.

In a preferred embodiment, the rotary vibration reduction device, in particular the coupling device, includes a further piston chamber. Further preferably, a further piston element can be moved in the further piston chamber. Further preferably, the further piston element seals the further piston chamber fluid-tightly against the piston chamber and can preferably be connected to the piston element, particularly preferably is produced integrally therewith. By such a configuration with such a further piston chamber, the vibration reduction actuator preferably has the form of an actuator, preferably a cylinder with two piston chambers between which the preferably connected piston element can move to and fro. To transmit a drive torque, the preferably connected piston element is displaced in the direction of one of the piston chambers, wherein this displacement tendency is countered by different working pressures in the piston chamber and in the further piston chamber. With the proposed embodiment, a rotary vibration reduction device is created in which the preferably connected piston element is clamped hydraulically between the piston chambers, and hence a particularly good controllability can be achieved.

In a further preferred embodiment, the rotary vibration reduction device, which in particular has a vibration reduction actuator with two piston chambers, includes a further pressure-generating device. Using this further pressure-generating device, in particular the further working pressure in the further piston chamber can be modified. Preferably, the further pressure-generating device is configured in the same way as the pressure-generating device.

In a preferred embodiment, the rotary vibration reduction device includes a further pressure-balancing device which may be connected fluid-conductively to the further pressure-generating device. Here, the further pressure-balancing device is a pressure-balancing device of the type described above and may have the same structure as or a different structure from the said pressure-balancing device.

In a preferred embodiment of the rotary vibration reduction device, in the torque transmission direction from the primary connector to the secondary connector, a spring device is arranged between these connectors. Preferably, the spring device is configured as a gas pressure spring device and preferably as a mechanical spring device with a solid-body spring. Preferably, this spring device has a steel spring or an elastomer spring as a spring element. Preferably, the spring device is arranged such that a spring force can be transmitted from the primary connector to the secondary connector. Further preferably, the spring device is arranged such that a change in this spring force can be provoked by a rotational movement of the primary connector relative to the secondary connector. In particular, using such a spring device, a particularly effective reduction of rotary vibrations can be achieved.

In a preferred embodiment, the vibration reduction actuator is arranged such that a cylinder force can be transmitted from the primary connector to the secondary connector. Preferably, this spring device and the vibration reduction actuator are connected together in series and mechanically, i.e. in relation to the forces which can be transmitted thereby. In particular in a static load case therefore, the spring force and the cylinder force are equal. In particular, because of the serial arrangement of the spring device and the vibration reduction actuator, it can be achieved that the primary connector can execute a particularly wide travel in relation to the secondary connector, or has a range with a first spring stiffness (spring device) and with a second spring stiffness (pressure-balancing device), and hence a soft damping of the rotary vibrations can be achieved.

In a preferred embodiment of the invention, the spring device and the vibration reduction actuator are connected together in parallel and mechanically, i.e. in relation to the forces they can transmit. With a parallel connection of the spring device and the vibration reduction actuator, the total forces they can transmit between the primary connector and the secondary connector are the sum of the individual forces. In particular, using such an arrangement, particularly high forces can be transmitted between the primary connector and the secondary connector, and particularly simple dimensioning of the vibration reduction actuator is possible.

In a preferred embodiment, the rotary vibration reduction device includes a decoupling device with a decoupling cylinder. Preferably, the decoupling cylinder includes a decoupler piston, a primary decoupler piston chamber and preferably a secondary decoupler piston chamber. Preferably, the decoupler piston is movable in the primary decoupler piston chamber. Preferably, the two decoupler piston chambers are separated from each other fluid-tightly by the decoupler piston. Further preferably, the pressure-generating device, or the further pressure-generating device or both, may be connected fluid-conductively to the primary decoupler piston chamber. Preferably, the secondary decoupler piston chamber may be connected fluid-conductively to the piston chamber or the further piston chamber. Preferably, the decoupler cylinder is thus configured as a hydraulic cylinder or as a gas pressure cylinder, wherein the term "cylinder" in this context should be understood in particular not as a geometric description but as a generally common description of such actuators. Further preferably, at least one or both decoupler piston chambers are also configured geometrically as cylinders. In particular, by means of such a decoupling device, a further pressure fluctuation may be applied to the coupling device, and in particular thus the rotational irregularities transmitted can be further reduced.

Further preferably, the decoupling device has a decoupling actuator, by which a force may be applied to the decoupler piston. Preferably, the decoupler piston may be excited by the decoupling actuator with a vibration which is preferably in contraphase to the rotary vibrations acting on the primary connector. Using such a contraphase vibration, the rotary vibrations which can be transmitted from the primary connector to the secondary connector are actively reduced. Preferably, the decoupling actuator is configured as an electromechanical actuator, further preferably as a hydraulic or pneumatic actuator. In particular, using such a decoupling device, an improved controllability of the rotary vibration reduction device can be achieved.

In a preferred embodiment of the invention, the pressure-generating device, or the further pressure-generating device or both, is arranged at one of the connectors (primary connector, secondary connector) or at least may be kinematically coupled to one of these. In particular, by this arrangement, the pressure-generating device, or the further pressure-generating device or both, thus rotates with one of the connectors on power transmission. In particular, using such an embodiment of the invention, it is possible that no pressurized media need be transmitted to the rotating connectors.

In a preferred embodiment, the rotary vibration reduction device includes an actuator with recuperation capacity. An actuator with recuperation capacity in the sense of the invention means an actuator for conversion of an alternating motion or a pressure fluctuation into preferably hydrostatic or preferably electrical energy. Preferably, this energy can be stored in an intermediate store, preferably an electrochemical or electrostatic accumulator, or in a pressure accumulator, and returned to the rotary vibration reduction device for its operation.

Preferably, the coupling device includes an actuator with recuperation capacity, preferably the vibration reduction cylinder is configured as or may be connected to an actuator with recuperation capacity. Further preferably, the pressure-generating devices, preferably the pressure-balancing device and particularly preferably the decoupler device, include such an actuator with recuperation capacity. In particular, using an actuator with recuperation capacity, the energy needs of the rotary vibration reduction device can be lowered and hence its particularly efficient operation is possible.

In a preferred embodiment of the invention, the pressure-generating device, or the further pressure-generating device or both, is arranged stationarily in relation to the rotational movement of the connectors (primary connector, secondary connector). Preferably, at least one of these two devices (pressure-generating device, further pressure-generating device) is arranged stationarily on a carrier element of a motor vehicle in which the rotary vibration reduction device is arranged. In particular, with such embodiments, the connectors rotate relative to at least one of the pressure-generating devices on transmission of the drive power.

To operate the rotary vibration reduction device, it is preferably provided that the rotational movement of the primary connector is detected, preferably the rotation speed is measured by at least one sensor, further preferably an angular acceleration is measured or derived from this rotational movement. Further preferably, an acceleration sensor is mounted on the rotary vibration reduction device in order to detect an angular acceleration, preferably of the primary connector or of the secondary connector or both.

To operate the rotary vibration reduction device, it is preferably furthermore provided that the rotational movement of the secondary connector is detected, preferably the rotation speed is measured by at least one sensor, further preferably an angular acceleration is measured or derived from this rotational movement.

Preferably, individual or all established values of the detected rotational movements are supplied to a calculating unit, which uses these rotational movements to control the working pressure in the piston chamber of the vibration reduction actuator or decoupling device or both. Further preferably, the working pressure is regulated such that the angular acceleration of the secondary connector is less than the angular acceleration of the primary connector. In particular, using a slight angular acceleration of the secondary connector, a particularly comfortable driving operation is possible.

A further method for controlling the rotary vibration reduction device is provided for starting a motor vehicle with an internal combustion engine and such a device, i.e. for starting the internal combustion engine in combustion mode. In particular, such a method is used for a so-called direct start, wherein direct start here means in particular that the starting of the internal combustion engine after it has been switched off to a precise position and a combustible fuel and air mixture is present in a combustion chamber. To start the internal combustion engine, the fuel and air mixture is now ignited and this start pulse is sufficiently large to operate the internal combustion engine further in combustion mode.

With conventional dual mass flywheels, it is possible that the start pulse is damped by the dual mass flywheel and operation in combustion mode is not therefore possible.

In the proposed method, preferably for direct start, the working pressure is increased to a threshold value which can be determined depending on the internal combustion engine and the drivetrain, and hence a stiffer coupling of the primary connector to the secondary connector is achieved than in normal operation, i.e. if the rotary vibration reduction device were operated in driving modes of the motor vehicle. In particular, due to this rotationally stiff coupling of the primary connector to the secondary connector, the start pulse of the internal combustion engine is not damped and its operation in combustion mode is possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
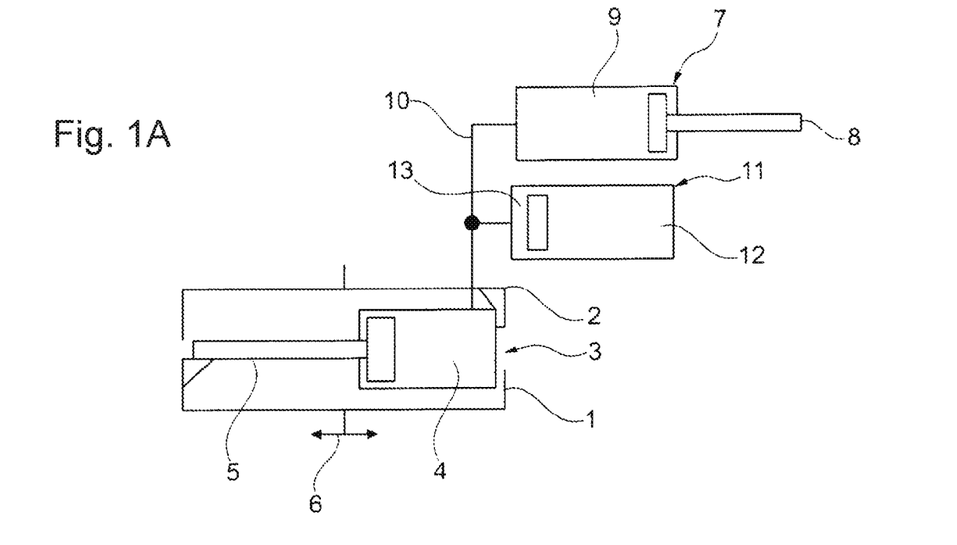
FIGS. 1A-1B show a circuit diagram of a first embodiment of the invention.
Figure 1B:
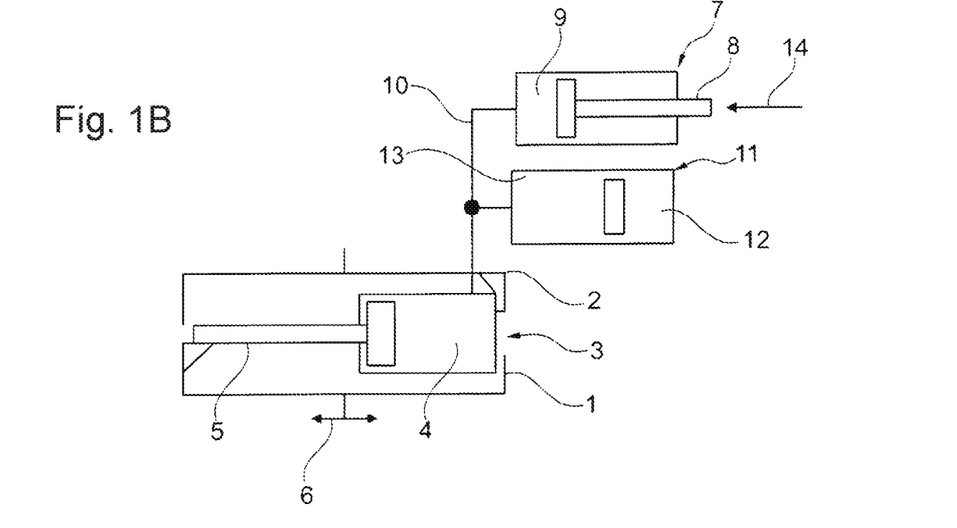

FIG. 1 shows an embodiment which is constructed similarly to a conventional dual mass flywheel, wherein the bow spring of the dual mass flywheel has been replaced by a hydraulic system with a vibration reduction cylinder configured as a hydraulic cylinder 4, 5 and a pressure-balancing device 11 with a gas spring 12. FIG. 1a shows an unloaded system, or a system for transmitting a low torque, and FIG. 1b shows a loaded system, or a system for transmitting a higher torque than in FIG. 1a.

The crankshaft (not shown) of an internal combustion engine is connected to the primary connector 1. In operation, in addition to the mean torque, the rotational irregularity 6 is imposed on the primary connector 1, which is reduced by the system shown and hence not effectively transmitted or only slightly transmitted to the secondary connector 2 which is connected to the further drivetrain (not shown).

The primary connector 1 is connected to the secondary connector 2 by the coupling device 3, which has a vibration reduction actuator configured as a hydraulic working cylinder. A rotational movement of the primary connector 1 relative to the secondary connector 2 is shown in the simplified figure as a longitudinal displacement of the two connectors 1, 2 in the direction of the rotational irregularity 6. The hydraulic cylinder 4, 5 of the coupling device 3 has a piston chamber 4 and a piston element 5 arranged movably in this piston chamber 4.

A working pressure which acts on the piston element 5 in the piston chamber 4 can be set via the pressure-generating device 7. The pressure-generating device 7 is also configured as a hydraulic cylinder and has a pressure-generating piston chamber 9 and a pressure-generating piston 8. If the pressure-generating piston 8 is moved into the piston chamber 9, the system is loaded because hydraulic oil is then pressed into the piston chamber 4 via the fluid line 10.

Furthermore, the system has a pressure-balancing device 11. The pressure-balancing device 11 is connected fluid-conductively to the pressure-generating piston chamber 9 of the device 7 via the fluid line 10. The pressure-balancing device 11 should be regarded as a compression spring device. To provide the spring rate, the pressure-balancing device 11 has a gas spring 12 and a working chamber 13 for receiving hydraulic oil.

When the pressure-generating piston 8 is moved into the pressure-generating piston chamber 9 for preloading of the system, hydraulic oil is pressed out of said chamber and loads the gas spring 12, and hence the system has a modified inherent frequency.

FIG. 1b shows the preloaded system. The pressure-generating piston 8 is moved into the pressure-generating piston chamber 9 in direction 14, and thus the pressure-generating device 7 presses hydraulic oil into the pressure-balancing chamber 13 via the fluid line 10, and the gas spring 12 is loaded.

If the unloaded system in FIG. 1a is now compared with the loaded system in FIG. 1b, in the system shown in FIG. 1b, a greater drive torque is transmitted from the primary connector to the secondary connector; however, in contrast to a purely mechanical system, there is no shift of the primary connector relative to the secondary connector 2 since the working pressure in the piston chamber 4 is increased by the pressure-generating device 7, by a movement of the pressure-generating piston 8 in direction 14. Due to this preload of the gas spring 12 of the pressure-balancing device 11, a particularly efficient reduction in rotary vibrations 6 is achieved.

In other words, the statically transmitted or mean torque is balanced by an adaptation of the pressure level.

Figure 2A:
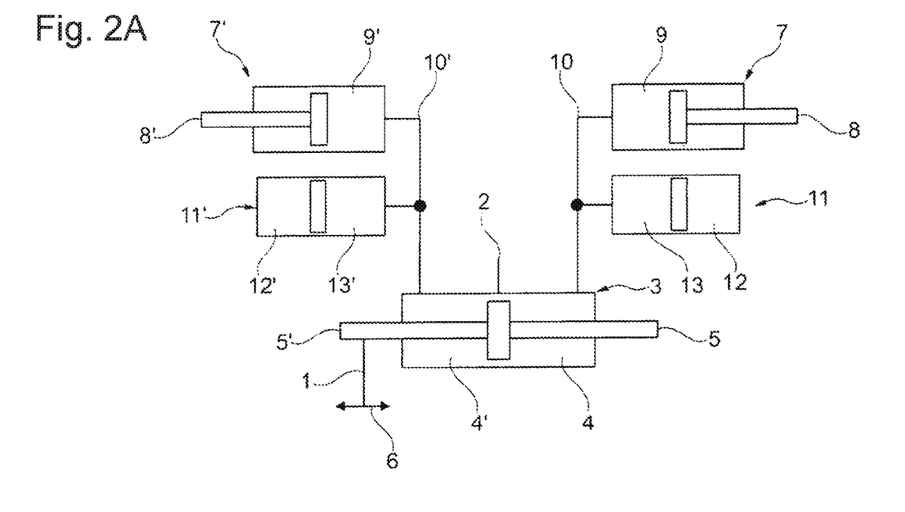
FIGS. 2A-2B show a circuit diagram of a second embodiment of the invention.
Figure 2B:
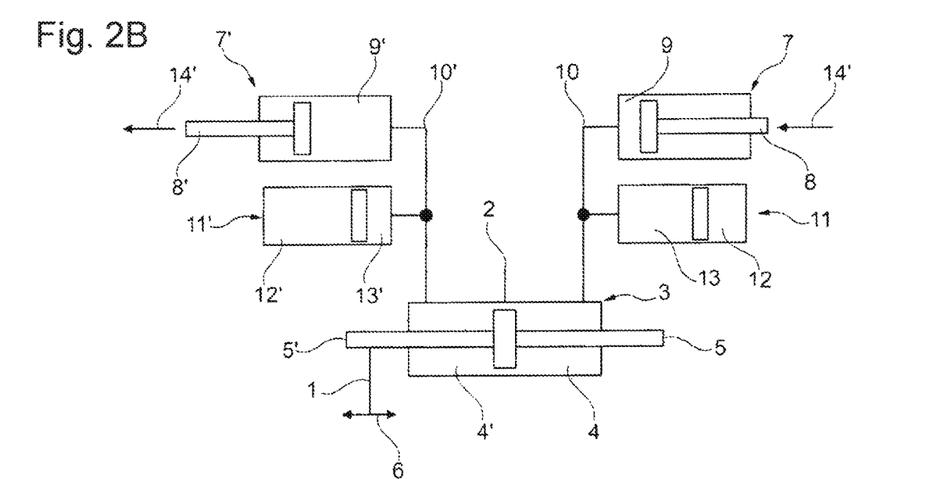

FIG. 2 shows a further embodiment of the invention. FIG. 2a shows an evenly loaded system, and FIG. 2b shows an unevenly loaded system. FIG. 2a shows a system for transmitting a low torque, and FIG. 2b a system for transmitting a higher torque than in FIG. 2a.

Substantially, the system shown in FIG. 2 is composed of two partial systems as shown in FIG. 1. Furthermore, the depiction substantially corresponds to the depiction shown in FIG. 1, wherein the system shown in FIG. 2 has two partial systems, and the elements of the second partial system in FIG. 2 are each indicated by numerals with an apostrophe.

The primary connector 1 is coupled to the secondary connector 2 via the coupling device 3. The coupling device 3 has a vibration reduction actuator configured as a hydraulic cylinder 4, 5 with a piston chamber 4 and a further piston chamber 4'. The piston element 5 is arranged movably in the piston chamber 4 and connected to the further piston element 5'.

The rotational irregularities 6 are imposed on the primary connector 1, and as far as possible must not be transmitted, or may be transmitted only slightly, to the secondary connector 2 by the coupling device 3. Using the partial system with a further pressure-generating device 7', which is connected fluid-conductively to the further pressure-balancing device 11' via a further fluid line 10', the further pressure-generating piston 8' is pressed into the further pressure-generating piston chamber 9', preloading the gas spring 12' of the further pressure-balancing device 11', and hence the further piston chamber 4' is loaded with a modified working pressure.

The same applies to the piston chamber 4 as already explained in relation to FIG. 1. In FIG. 2a, the same working pressure is set in the piston chamber 4 and in the further piston chamber 4'.

FIG. 2b shows a system in which the pressure-generating piston chamber 8 of the pressure-generating device 7 is moved in direction 14 and hence the gas spring 12 of the pressure-balancing device 11 loaded. Furthermore, by a movement of the further pressure-generating piston 8' of the further pressure-generating device 7' in the direction 14', the gas spring 12' of the further pressure-balancing device 11' is preloaded, the piston elements 5, 5' are thus hydraulically clamped and a particularly good controllability can be achieved by different working pressures in the piston chambers 4, 4'. A differential force, which arises from the different working pressures in the piston chambers 4, 4', is the reaction force to the drive torque transmitted from the primary connector 1 to the secondary connector 2, in particular the mean torque.

In particular, in the embodiment of the invention shown in FIG. 2, two gas springs 12, 12' work against each other, and the movement of the piston elements 5, 5', which are configured integrally with each other, causes a pressure build-up in the one gas spring and a pressure fall in the other gas spring. The stroke of the coupling device 3, i.e. a movement of the piston elements 5, 5', here corresponds to the rotational irregularity in direction 6. A static moment is balanced by adaptation of the pressure levels in the piston chambers 4, 4'. Due to equal pressure levels in the two piston chambers 4, 4', a neutral position of the rotary vibration reduction device can be set.

Figure 3A:
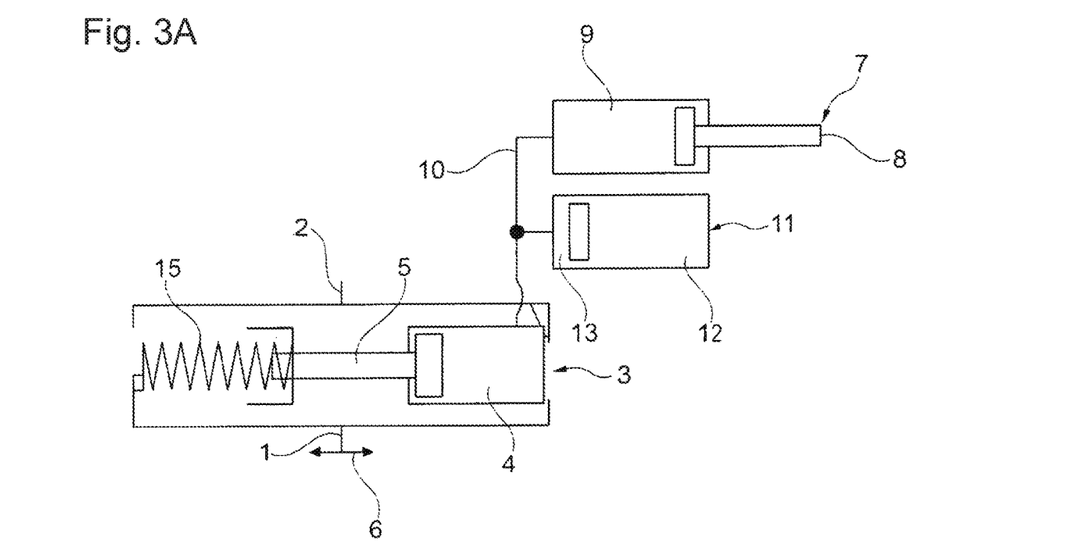
FIGS. 3A-3B show a circuit diagram of a third embodiment of the invention.
Figure 3B:
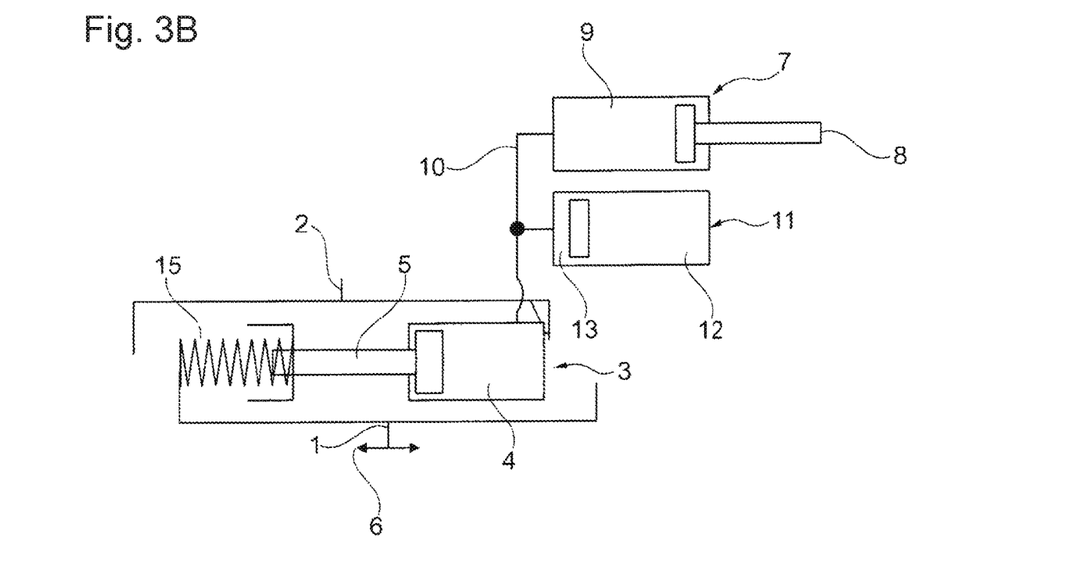

FIG. 3 shows an embodiment of the invention in which a mechanical spring device 15 is connected together with the hydraulic cylinders 4, 5 to form the coupling device 3.

FIG. 3a shows an unloaded system, or a system for transmitting a low torque, and FIG. 3b shows a loaded system, or a system for transmitting a higher torque than in FIG. 3a.

The embodiment of the invention shown in FIG. 3 corresponds substantially to the embodiment of the invention shown in FIG. 1, at least in relation to the hydraulic elements 4, 5, 7, 10, 11; therefore, the main differences between the two embodiments will be discussed below.

The primary connector 1 is coupled to the secondary connector 2 via the coupling device 3. FIG. 3a shows a system in which the mechanical spring device 15 is not compressed or is only slightly compressed, i.e. a low drive torque is present between the primary connector 1 and the secondary connector 2 or is transmitted thereby.

FIG. 3b shows an operating state of the system in which the mechanical spring device 15 is completely or almost completely compressed, i.e. the transmitted drive torque is greater than in the system shown in FIG. 3a, and the rotational irregularities 6 are then damped or reduced substantially via the mechanical spring device 15 and hence via the hydraulic cylinder 4, 5.

The coupling device 3 includes a vibration reduction cylinder, configured as a hydraulic cylinder 4, 5, and a mechanical spring device 15, wherein the two devices are connected in series with each other.

If the working pressure in the piston chamber 4 is increased via the pressure-generating device 7, the hydraulic cylinder 4, 5 can be switched stiffly, i.e. the gas spring 12 is preloaded so far that this is practically no longer significantly sprung, i.e. a fluid column of the hydraulic fluid is stationary in the fluid line 10 despite pressurization of the primary connector 1 with rotational irregularities 6.

In such a case (stationary fluid column), only the mechanical spring device 15 still compensates for the rotational irregularities 6. At another operating point, the preload of the gas spring 12 is reduced via the pressure-generating device 7 so far that the rotational irregularities 6 are compensated completely or for the largest part by the hydraulic cylinder 4, 5, and no longer via the mechanical spring device 15.

Furthermore, it is also possible to assume practically any arbitrary operating state between the two extreme operating states outlined above, i.e. to set the gas spring 12 with a preload such that both the mechanical spring device 15 and the hydraulic cylinder 4, 5 of the coupling device 3 compensate for rotational irregularities 6.

It is preferred if the system is configured such that low drive torques are supported by the mechanical spring device 15. At higher drive torques, mainly or exclusively the hydraulic system is used, i.e. the hydraulic cylinder 4, 5 in conjunction with the gas spring 12; in particular, at high drive torques, the mechanical spring device 15 is completely compressed.

Figure 4A:
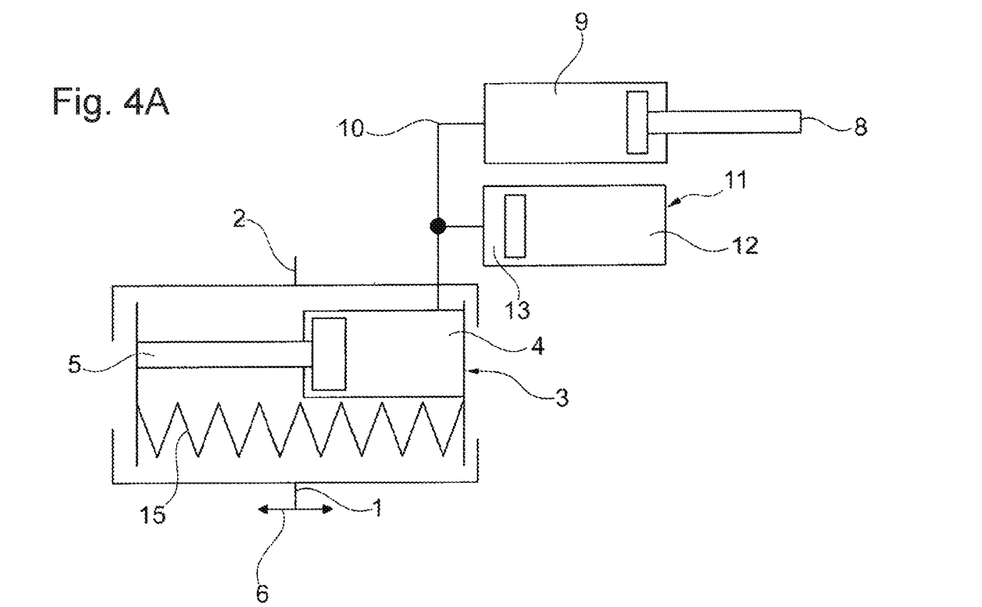
FIGS. 4A-4B show a circuit diagram of a fourth embodiment of the invention.
Figure 4B:
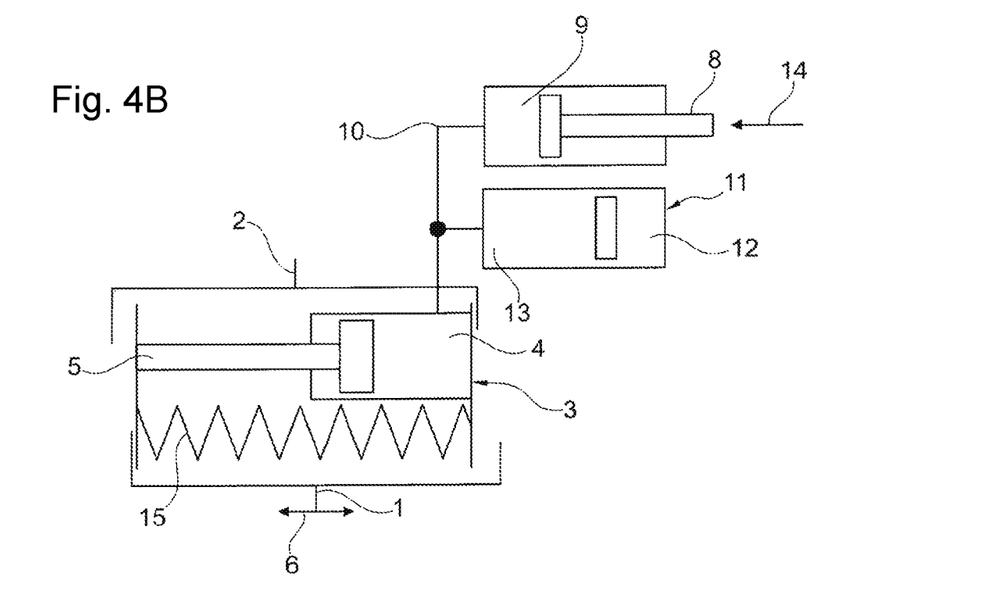

FIG. 4 shows a system in which the mechanical spring device 15 is arranged in parallel to the hydraulic cylinder 4, 5 of the coupling device 3 in relation to force transmission. The basic system here again corresponds to the system already explained with reference to FIG. 1; therefore the essential differences from such a system are discussed below. FIG. 4a shows an unloaded system or a system for transmitting a low torque, and FIG. 4b shows a loaded system or a system for transmitting a higher torque than in FIG. 4a.

FIG. 4a shows a system in which only a low torque is transmitted from the primary connector 1 via the coupling device 3 to the secondary connector 2. The hydraulic cylinder 4, 5 and the mechanical spring device 15 are here substantially unloaded. Rotational irregularities 6 lead to a movement of the mechanical spring device 15 and the hydraulic cylinder 4, 5 equally.

FIG. 4b shows a system in which a higher torque than in FIG. 4a is transmitted from the primary connector 1 to the second connector 2. The mechanical spring device 15 and the hydraulic cylinder 4, 5 are moved out of their rest position. It is however also possible that the working pressure in the piston chamber 4 is set so that such a twist of the secondary connector 2 relative to the primary connector 1 does not occur.

The rotational irregularities 6 are damped equally via the mechanical spring device 15 and also via the hydraulic cylinder 4, 5 and hence via the gas spring 12.

Figure 5A:
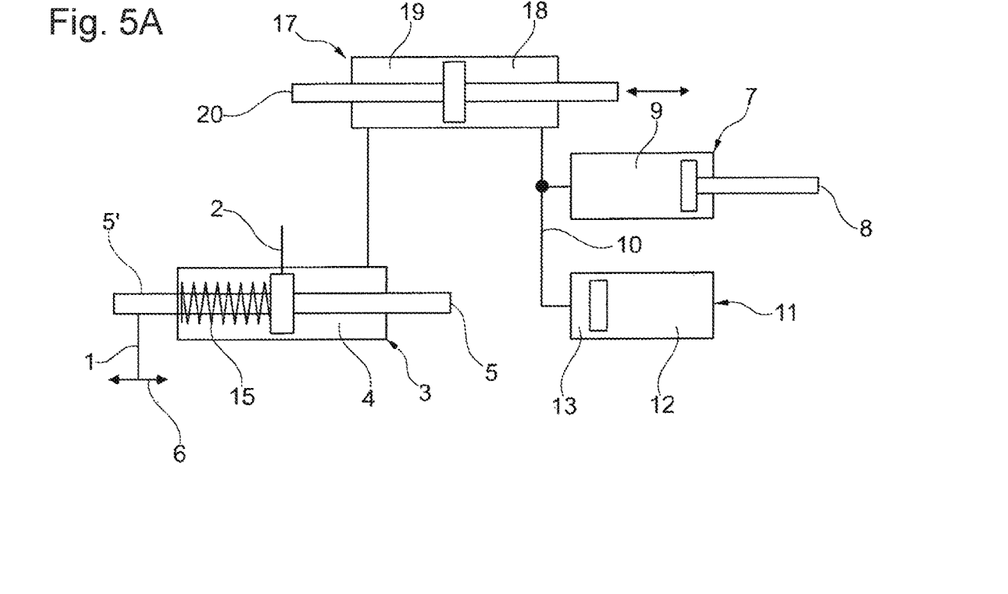
FIGS. 5A-5B show a circuit diagram of a fifth embodiment of the invention.
Figure 5B:
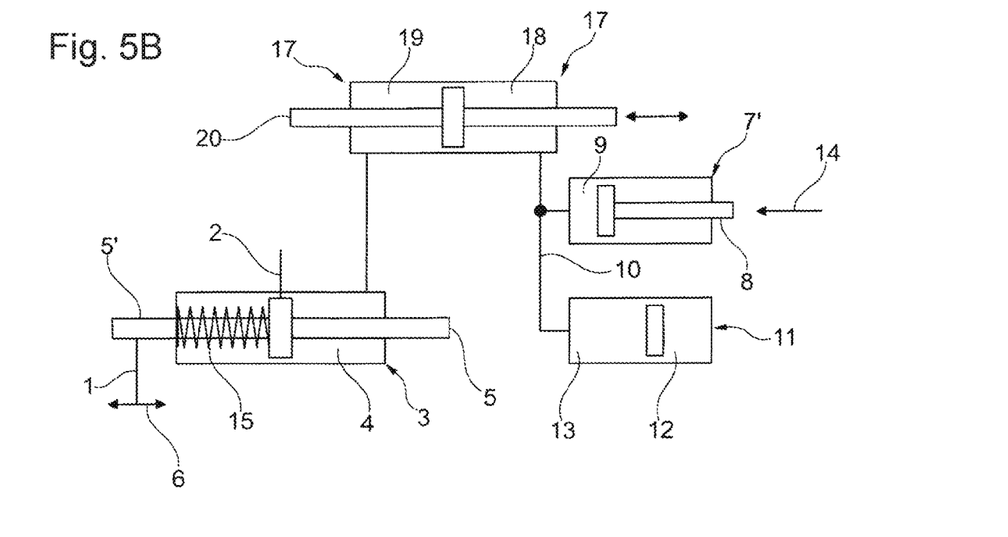

FIG. 5 shows a fully active hydraulic system for reducing rotational irregularities. FIG. 5a shows the system when a low drive torque is transmitted from the primary connector 1 to the secondary connector 2, and FIG. 5b shows the same system when a higher drive torque is transmitted.

Such a system has the components already described in the preceding figures, namely the pressure-generating device 7 and the pressure-balancing device 11. Via a movement of the pressure-generating piston 8 in direction 14 in the pressure-generating piston chamber 9, the preload of the gas spring 12 can be modified and hence a higher drive torque transmitted without a twist of the primary connector relative to the secondary connector.

Here, this setting of the working pressure not only acts directly or fluid-conductively on the piston chamber 4 of the hydraulic cylinder 4, 5 of the coupling device 3, but is transmitted indirectly via the decoupling device configured as an absorber device 17. The absorber device 17 has a primary absorber piston chamber 18 and a secondary absorber piston chamber 19, and an absorber piston 20 which is arranged movably in the absorber piston chambers 18, 19.

The secondary absorber piston chamber 19 is connected fluid-conductively to the piston chamber 4. If the working pressure in the piston chamber 4 is increased, the pressure-generating piston 8 is moved in direction 14, as shown in FIG. 5b, and hence a higher drive torque can be transmitted from the primary connector 1 to the secondary connector 2 without the connectors 1, 2 twisting relative to each other, than when a lower working pressure is present in the piston chamber 4, as shown in FIG. 5a.

Using a decoupling actuator (not shown), a force can be applied to the absorber piston 20 to move the absorber piston 20 in the absorber piston chambers 18, 19; hence a contraphase pressure fluctuation can be actively applied to the rotational irregularities 6, and thus an improved decoupling of the primary connector 1 from the secondary connector 2 can be achieved.

The absorber device 17 forms a vibratable system via the gas spring 12 with which it is fluid-conductively connected via the fluid line 10, by which system the rotational irregularities 6 imposed on the primary connector 1 can be reduced. Furthermore, with such a system, in principle it is possible to apply the working pressure necessary for transmission of the mean torque by the pressure-generating device and actively reduce rotational irregularities by means of the absorber device.

The coupling device 3 has a vibration reduction cylinder formed as a hydraulic cylinder 4, 5, 5'. As well as the piston chamber 4 and the piston element 5, this includes a further piston element 5'. The mechanical spring device 15 is connected in parallel to the hydraulic cylinder 4, 5, 5'.

As explained, it is also possible to apply an additional absorption force to the absorber piston 20, which counters its movement and hence allows a further possibility for reducing rotational irregularities 6.

Figure 6:
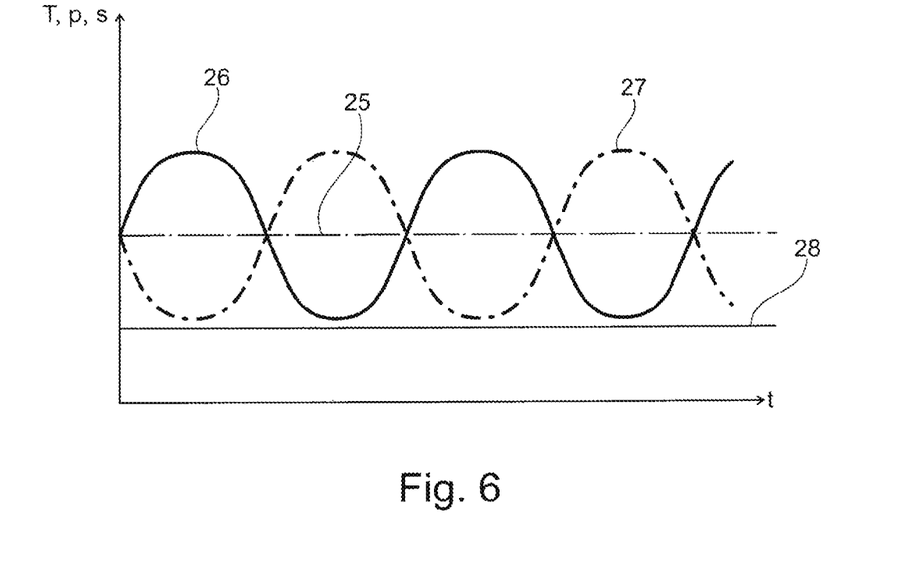
FIG. 6 shows a diagrammatic depiction of rotational irregularity, mean torque and vibration of an embodiment of a decoupler device of the invention.

FIG. 6 shows a diagrammatic depiction of the pressure 28 applied by the pressure-generating device, and further variables (p: pressure, T: torque, s: travel) shown over time t. The mean torque 25 is transmitted from the primary to the secondary connector, and is overlaid with the sinusoidal rotational irregularity 26. With a corresponding setting of the pressure 28 acting on one of the piston chambers 4, 4', or resulting therefrom as a pressure difference, the twist of the two connectors (primary, secondary connector) can be kept small; or in other words, the pressure 28 behaves proportionally to the mean torque 25.

In order to achieve an improved dynamic of the rotary vibration reduction device, this may include a decoupling device (see FIG. 5) with which a vibration 27 in contraphase to the sinusoidal rotational irregularity 26 can be applied to the device. This contraphase vibration 27 may be generated by movement or displacement of the absorber piston in the decoupling device.

By individual or all of the rotary vibration reduction devices outlined above in FIGS. 1 to 5, the following advantages can be achieved:

In comparison with a conventional dual mass flywheel (ZMS), the controlled, preferably electronically controlled damper offers a variable damping and hence a significant added value perceptible to every driver;

This is because the damper is not "factory" preset with a rigid damper curve, which under full load driving has the same setting as in partial load driving;

The adaptive or controlled damper sets the correct damping hardness for each vibration case, and via actuators, in particular via the vibration reduction cylinder, actively conducts energy into the system in the form of force which acts counter to the rotational irregularity 6;

In operation of the rotary vibration reduction device, at least some of the electrical energy required for its operation can be provided by an actuator, wherein such actuators are known in themselves and described as actuators with recuperation capacity. These can convert some of the rotational irregularities into electrical energy and temporarily store this, in order then to make this available to the rotary vibration reduction device for its operation.

From the connections outlined above, further functionalities can be derived for the rotary vibration reduction device:

Using the improved isolation of rotational irregularities outlined above, i.e. because fewer rotational irregularities are transmitted from the primary connector to the secondary connector, an increase in comfort by improved driving acoustics can be achieved;

Furthermore, the use of a high torque potential at low rotation speeds becomes possible; this is usually impaired by high rotational irregularities and cannot therefore be used in conventional systems; hence a $CO_2$ reduction can be achieved;

Fault-free starting on the level and on uphill gradients with differing torque requirements in the two driving situations is possible, and hence a further increase in comfort can be achieved;

In some "Stop & go" driving situations, it is possible to drive without using the clutch, in a fashion similar to an automatic, and hence a further comfort improvement can be achieved in congested traffic, during maneuvering and crawling;

Furthermore, with the proposed invention, an anti-grab control of the clutch is possible and hence a further comfort increase can be achieved; in particular, a comfort increase can be achieved by smoothing out such clutch grab vibrations on start-up;

Within certain limits, via the vibration reduction cylinder, a micro-slip, i.e. a twist of the primary connector relative to the secondary connector, becomes possible, and hence a further comfort increase can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for reducing rotary vibrations for a motor vehicle, the motor vehicle comprising:
    a drive machine;
    a drivetrain configured to receive torque from the drive machine for transmission of drive power to at least one wheel of the motor vehicle;
    a primary connector between the drive machine and the drive train configured to receive the torque from the drive machine;
    a secondary connector between the drive machine and the drive train configured to output the torque from the first connector to the drivetrain;
    a coupling device between the primary connector and the secondary connector configured to transfer the torque from the drive machine from the primary connector to the secondary connector, the coupling device including a vibration reduction actuator with a coupling piston chamber and a coupling piston displaceably arranged in the coupling piston chamber;
    a pressure generating device fluidly coupled to the coupling piston chamber by a first fluid line; and
    a pressure-balancing device fluidly coupled to the pressure-generating device via the first fluid line,
    wherein
        the coupling piston is configured to generate a vibration reduction force when loaded with a working pressure in the coupling piston chamber,
        the coupling piston chamber and the coupling piston are coupled to the primary and the secondary connectors such that a rotational movement of the primary connector relative to the secondary connector causes the coupling piston to be displaced in the coupling piston chamber counter to the vibration reduction force, and
        the working pressure in the coupling piston chamber is variable in response to pressure generated by the pressure-generating device.

2. The rotary vibration reduction device as claimed in claim 1, further comprising:
    a further coupling pressure chamber arranged in the coupling device,
    wherein the piston chamber and the further piston chamber are separated fluid-tightly from each other by the coupling piston.

3. The rotary vibration reduction device as claimed in claim 2, wherein
    the further pressure generating device is fluidly coupled to the further piston chamber such that a working pressure in the further piston chamber is variable in response to pressure generated by the further pressure-generating device.

4. The rotary vibration reduction device as claimed in claim 3, further comprising:
    a further pressure-balancing device fluidly coupled to the further pressure-generating device.

5. The rotary vibration reduction device as claimed in claim 4, further comprising:
    a decoupling device with a decoupling cylinder having a primary decoupler piston chamber, a secondary decoupler piston chamber, and a decoupler piston arranged in the decoupling cylinder such that the primary and secondary decoupler piston chambers are separated fluid-tightly from each other by the decoupler piston, wherein
        the pressure-generating device is fluidly connectable to the primary decoupler piston chamber, and
        the secondary decoupler piston chamber is selectively fluidly connectable to the coupling piston chamber or to the further coupling piston chamber.

6. The rotary vibration reduction device as claimed in claim 5, wherein
    the decoupling device has a decoupling actuator configured to vibrate the decoupler piston in contraphase to rotational irregularities between the drive machine and the drivetrain.

7. The rotary vibration reduction device as claimed in claim 4, wherein
    at least one of the pressure-generating device and the further pressure-generating device is arranged to rotated with a corresponding one of the primary and secondary connectors.

8. The rotary vibration reduction device as claimed in claim 4, wherein
    at least one of the pressure-generating device and the further pressure-generating device is arranged in a stationary manner on a carrier element of a motor vehicle, such that the primary and secondary connectors rotate relative to at least one of the pressure-generating device and the further pressure-generating device arranged on the carrier element.

9. The rotary vibration reduction device as claimed in claim 1, further comprising:
    a spring device is arranged between the primary connector and the secondary connector in a torque transmission direction such that a spring force generated by the spring device is transmittable from the primary connector to the secondary connector,
    wherein the spring force is changed when the primary connector rotates relative to the secondary connector.

10. The rotary vibration reduction device as claimed in claim 9, wherein
    the spring device and the vibration reduction actuator are connected mechanically in series.

11. The rotary vibration reduction device as claimed in claim 9, wherein
    the spring device and the vibration reduction actuator are connected mechanically in parallel.

12. The rotary vibration reduction device as claimed in claim 1, wherein
    the vibration reduction actuator is an energy recuperating actuator.

13. A method for reducing rotary vibrations for a motor vehicle, the motor vehicle including
    a drive machine,
    a drivetrain configured to receive torque from the drive machine for transmission of drive power to at least one wheel of the motor vehicle,
    a primary connector between the drive machine and the drive train configured to receive the torque from the drive machine,
    a secondary connector between the drive machine and the drive train configured to output the torque from the first connector to the drivetrain,
    a coupling device between the primary connector and the secondary connector configured to transfer the torque from the drive machine from the primary connector to the secondary connector, the coupling device including a vibration reduction actuator with a coupling piston chamber,
a further coupling piston chamber,
a coupling piston displaceably fluid-tightly separating the coupling piston chamber from the further coupling piston chamber, the coupling piston chamber and the coupling piston being coupled to the primary and the secondary connectors such that a rotational movement of the primary connector relative to the secondary connector causes the coupling piston to be displaced counter to the vibration reduction force,
a pressure generating device fluidly coupled to the coupling piston chamber such that a working pressure in the coupling piston chamber is variable in response to pressure generated by the pressure-generating device,
a further pressure generating device fluidly coupled to the further coupling piston chamber such that a working pressure in the further coupling piston chamber is variable in response to pressure generated by the further pressure-generating device,
a pressure-balancing device fluidly coupled to the pressure-generating device such that a working pressure in the coupling piston chamber is variable in response to pressure generated by the pressure-generating device,
a further pressure-balancing device fluidly coupled to the further pressure-generating device such that a working pressure in the further coupling piston chamber is variable in response to pressure generated by the further pressure-generating device, and
a first sensor configured to detect a rotational movement of the primary connector and a second sensor configured to detect a rotational movement of the second connector,
wherein the coupling piston is configured to generate a vibration reduction force when loaded with a working pressure in at least one of the coupling piston chamber and the further coupling piston chamber,
the method comprising the acts of:
detecting a rotational movement of the primary connector with the first sensor,
detecting a rotational movement of the secondary connector with the second sensor, and
regulating the working pressure in at least one of the piston chamber and the further piston chamber based on the detected rotational movements to actuate the coupling element in a manner counter to rotational irregularities between the drive machine and the drivetrain.

14. The method as claimed in claim 13, further comprising the act of:
detecting using the first and second sensors an amount of rotation of the primary connector relative to the secondary connector;
regulating the working pressure in at least one of the coupling piston chamber and the further coupling piston chamber in a manner that counters the relative rotation of the primary and secondary connectors using a decoupling device,
wherein
the decoupling device includes a decoupling cylinder having a primary decoupler piston chamber, a secondary decoupler piston chamber, and a decoupler piston arranged in the decoupling cylinder such that the primary and secondary decoupler piston chambers are separated fluid-tightly from each other by the decoupler piston,
the primary decoupler piston chamber is fluidly connectable to the pressure-generating device, and
the secondary decoupler piston chamber is selectively fluidly connectable to the coupling piston chamber or to the further coupling piston chamber.

15. A method for starting a motor vehicle, the motor vehicle including
a drive machine in the form of an internal combustion engine,
a drivetrain configured to receive torque from the drive machine for transmission of drive power to at least one wheel of the motor vehicle,
a primary connector between the drive machine and the drive train configured to receive the torque from the drive machine,
a secondary connector between the drive machine and the drive train configured to output the torque from the first connector to the drivetrain,
a coupling device between the primary connector and the secondary connector configured to transfer the torque from the drive machine from the primary connector to the secondary connector, the coupling device including a vibration reduction actuator with a coupling piston chamber,
a further coupling piston chamber,
a coupling piston displaceably fluid-tightly separating the coupling piston chamber from the further coupling piston chamber, the coupling piston chamber and the coupling piston being coupled to the primary and the secondary connectors such that a rotational movement of the primary connector relative to the secondary connector causes the coupling piston to be displaced counter to the vibration reduction force,
a pressure generating device fluidly coupled to the coupling piston chamber such that a working pressure in the coupling piston chamber is variable in response to pressure generated by the pressure-generating device,
a further pressure generating device fluidly coupled to the further coupling piston chamber such that a working pressure in the further coupling piston chamber is variable in response to pressure generated by the further pressure-generating device,
a pressure-balancing device fluidly coupled to the pressure-generating device such that a working pressure in the coupling piston chamber is variable in response to pressure generated by the pressure-generating device,
a further pressure-balancing device fluidly coupled to the further pressure-generating device such that a working pressure in the further coupling piston chamber is variable in response to pressure generated by the further pressure-generating device, and
a first sensor configured to detect a rotational movement of the primary connector and a second sensor configured to detect a rotational movement of the second connector,
wherein the coupling piston is configured to generate a vibration reduction force when loaded with a working pressure in the coupling piston chamber,
the method comprising the act of:
increasing the working pressure in at least one of the coupling piston chamber and the further coupling piston chamber to above a predefined threshold value such that the primary connector and the secondary connector are rotationally fixed relative to one another during an engine start.

16. The method as claimed in claim 15, further comprising the act of:
- detecting using the first and second sensors an amount of rotation of the primary connector relative to the secondary connector;
- regulating the working pressure in at least one of the coupling piston chamber and the further coupling piston chamber in a manner that counters the relative rotation of the primary and secondary connectors using a decoupling device,
- wherein
  - the decoupling device includes a decoupling cylinder having a primary decoupler piston chamber, a secondary decoupler piston chamber, and a decoupler piston arranged in the decoupling cylinder such that the primary and secondary decoupler piston chambers are separated fluid-tightly from each other by the decoupler piston,
  - the primary decoupler piston chamber is fluidly connectable to the pressure-generating device, and
  - the secondary decoupler piston chamber is selectively fluidly connectable to the coupling piston chamber or to the further coupling piston chamber.

* * * * *